(12) United States Patent
Yamamoto

(10) Patent No.: US 8,049,809 B2
(45) Date of Patent: Nov. 1, 2011

(54) SOLID-STATE IMAGE PICKUP DEVICE AND ELECTRONIC INSTRUMENTS

(75) Inventor: Katsumi Yamamoto, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 331 days.

(21) Appl. No.: 12/453,113

(22) Filed: Apr. 29, 2009

(65) Prior Publication Data

US 2009/0213254 A1    Aug. 27, 2009

Related U.S. Application Data

(63) Continuation of application No. PCT/JP2007/071678, filed on Nov. 8, 2007.

(30) Foreign Application Priority Data

Nov. 14, 2006    (JP) .................................. 2006-308213

(51) Int. Cl.
    *H04N 5/225*    (2006.01)
(52) U.S. Cl. ........................................ 348/340
(58) Field of Classification Search .................... 348/45, 348/65, 373–375, 340, 207.99
    See application file for complete search history.

(56) References Cited

U.S. PATENT DOCUMENTS

| | | | | |
|---|---|---|---|---|
| 4,594,613 A * | 6/1986 | Shinbori et al. | ............... | 348/340 |
| 5,040,069 A * | 8/1991 | Matsumoto et al. | ............ | 348/76 |
| 7,528,880 B2 * | 5/2009 | Yamaguchi et al. | .......... | 348/335 |
| 2005/0219398 A1 | 10/2005 | Sato et al. | | |

FOREIGN PATENT DOCUMENTS

| | | |
|---|---|---|
| JP | 2002-299592 | 10/2002 |
| JP | 2004-221875 | 8/2004 |
| JP | 2005-167243 | 6/2005 |
| JP | 2005-229609 | 8/2005 |
| JP | 2005-286888 | 10/2005 |
| KR | 10-2005-0053201 | 6/2005 |
| KR | 10-2006-0094054 | 8/2006 |

OTHER PUBLICATIONS

International Search Report for International Application PCT/JP2007/071678, mailed Jan. 15, 2008.

Korean Office Action mailed Aug. 26, 2010 in the corresponding Korean patent Application No. 10-2009-70097700.

English Translation of the International Preliminary Report on Patentability mailed Jun. 4, 2009 in corresponding International Patent Application PCT/JP2007/071678.

* cited by examiner

*Primary Examiner* — Tuan Ho

(57) ABSTRACT

A solid-state image pickup device which includes a circuit board provided with a hole and with a circuit layer formed thereon, a solid-state image pickup element housed in the hole and having an upper surface constituting a light-receiving face and electrodes formed on a peripheral portion of the upper surface, and a glass plate disposed over the light-receiving face and provided with a connecting conductive layer which is extended from the underside of the glass plate, via the sidewall of the glass plate, to the upper surface of the glass plate. The electrode is electrically connected with the connecting conductive layer formed on the underside of glass plate, and the connecting conductive layer is electrically connected with the circuit layer formed on the upper surface of the circuit board.

10 Claims, 3 Drawing Sheets

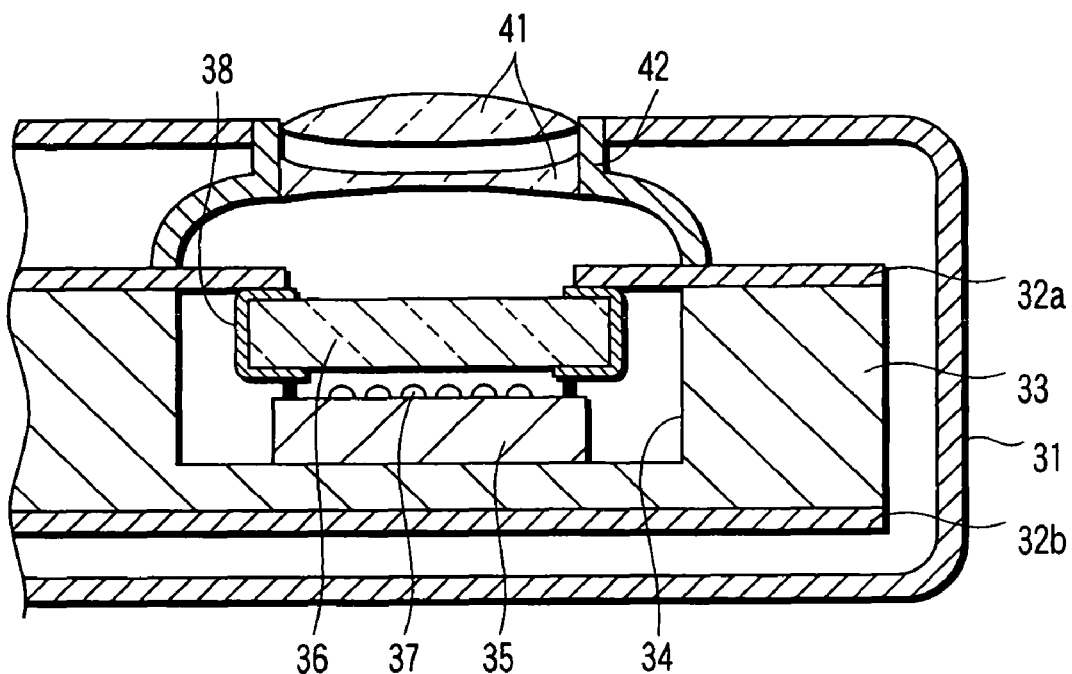
F I G. 3
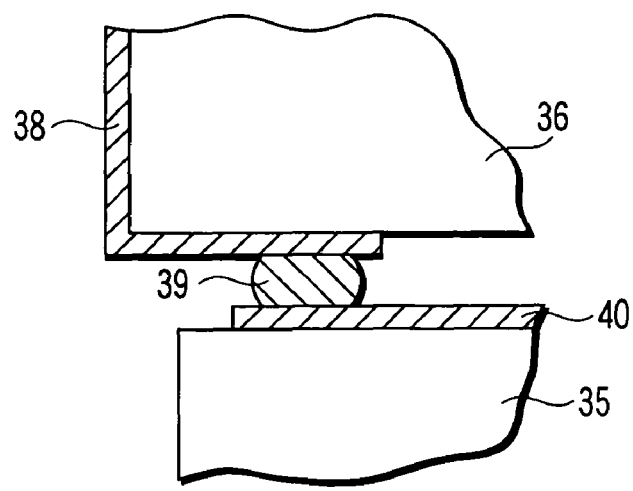
F I G. 4

SOLID-STATE IMAGE PICKUP DEVICE AND ELECTRONIC INSTRUMENTS

CROSS-REFERENCE TO RELATED APPLICATIONS

This is a Continuation Application of PCT Application No. PCT/JP2007/071678, filed Nov. 8, 2007, which was published under PCT Article 21(2) in Japanese.

This application is based upon and claims the benefit of priority from prior Japanese Patent Application No. 2006-308213, filed Nov. 14, 2006, the entire contents of which are incorporated herein by reference.

BACKGROUND OF THE INVENTION

1. Field of the Invention

This invention relates to a solid-state image pickup device and to an electronic instrument such as a mobile telephone which is equipped with the solid-state image pickup device.

2. Description of the Related Art

In recent years, digital cameras and video cameras utilizing a solid-state image pickup device including a solid-state image pickup element such as a CCD or C-MOS device have been increasingly popularized and, at the same time, the techniques to further miniaturize the solid-state image pickup device by making use of a chip-size package (CSP) system have been developed (see for example, JP-A 2005-167243 and JP-A 2005-229609). The solid-state image pickup element of such a small size is suitable in building it into electronic equipment such as a mobile telephone where miniaturization, weight-saving and the reduction of thickness are desired.

As shown in FIG. 1, such a small size solid-state image pickup device 10 is constructed such that a solid-state image pickup element 13 is mounted on a circuit board 12 arranged on the bottom of an outer case 11 and, over this solid-state image pickup element 13, an infrared-cut filter 14 and a lens-barrel 16 equipped with lenses 15 are disposed.

Electrode pads (not shown) provided at a peripheral region of the light-receiving face of the solid-state image pickup element 13 are electrically connected, through wires 17, with bumps 18 for external connection at the underside of the outer case 11.

The thickness of this small size solid-state image pickup device 10 constructed as shown in FIG. 1 is about 7 to 12 mm.

When it is desired to build this small size solid-state image pickup device 10 constructed as described above into a mobile telephone, it is necessarily mounted on a printed circuit board 22 attached inside the outer frame 21 of mobile telephone as shown in FIG. 2, resulting in an increase of thickness as a whole of mobile telephone.

Thus, it is now desired to promote the miniaturization, weight-saving and the reduction in thickness of the solid-state image pickup device in order to build it into small electronic equipment such as a mobile telephone, etc.

BRIEF SUMMARY OF THE INVENTION

It is an object of the present invention to provide a thin solid-state image pickup device which is capable of creating an electronic equipment of thin structure when the solid-state image pickup device is built into the electronic equipment.

It is another object of the present invention to provide an electronic equipment having such a solid-state image pickup device incorporated therein.

According to a first aspect of the present invention, there is provided a solid-state image pickup device which comprises: a circuit board provided with a hole having an open top and with a circuit layer formed on the upper surface thereof; a solid-state image pickup element housed in the hole and having an upper surface constituting a light-receiving face and electrodes formed on a peripheral portion of the upper surface; and a glass plate disposed over the light-receiving face of the solid-state image pickup element and provided with a connecting conductive layer which is extended from the underside of the glass plate, via the sidewall of the glass plate, to the upper surface of the glass plate; wherein the electrode formed on the peripheral portion of the light-receiving face of the solid-state image pickup element is electrically connected with the connecting conductive layer formed on the underside of glass plate; and the connecting conductive layer formed on the upper surface of glass plate is electrically connected with the circuit layer formed on the upper surface of the circuit board.

According to a second aspect of the present invention, there is provided an electronic equipment comprising an outer frame having an opening; the aforementioned solid-state image pickup device incorporated in the outer frame; and a lens member secured to the opening of the outer frame in a manner to face a light-receiving face of the solid-state image pickup device.

According to the present invention, since the solid-state image pickup element is housed in the hole of the circuit board, it is possible to make thinner the solid-state image pickup device and, at the same time, since the electric connection between the solid-state image pickup element and the circuit board is realized by making use of the connecting conductive layer formed on the sidewall of the glass plate, it is no longer required to form a sidewall-surrounding circuit layer on the sidewall of the solid-state image pickup element and to form a wiring so as to extend from the upper surface to the underside of the solid-state image pickup element as seen in the conventional solid-state image pickup device, thereby making it possible to simplify the structure of the solid-state image pickup device and to reduce the manufacturing cost of the solid-state image pickup device.

BRIEF DESCRIPTION OF THE SEVERAL VIEWS OF THE DRAWING

FIG. 3 is a cross-sectional view illustrating a part of a mobile telephone in which the solid-state image pickup device according to one embodiment of the present invention is incorporated;

FIG. 4 is a cross-sectional view illustrating a connected portion of the solid-state image pickup device shown in FIG. 3.

DETAILED DESCRIPTION OF THE INVENTION

Figure 1:
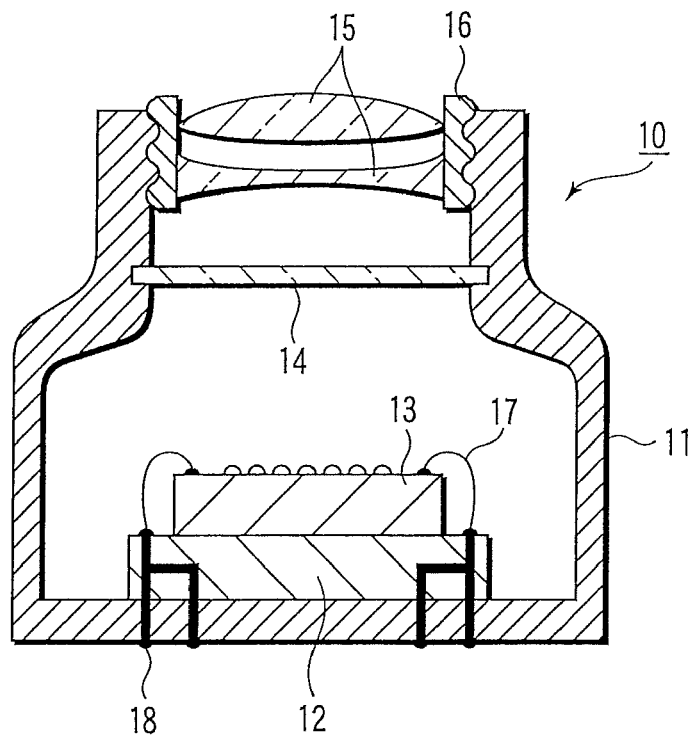
FIG. 1 is a cross-sectional view illustrating a solid-state image pickup device according to the prior art.
Figure 2:
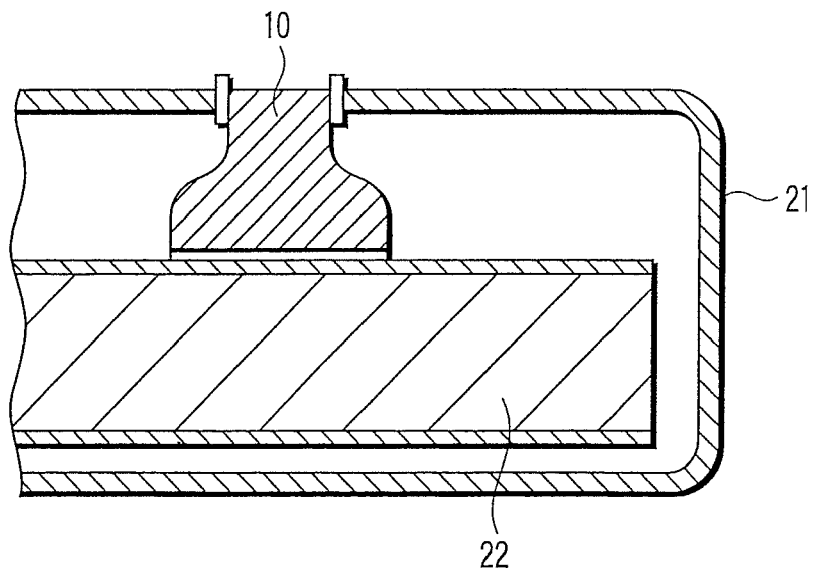
FIG. 2 is a cross-sectional view illustrating a part of a mobile telephone in which the solid-state image pickup device shown in FIG. 1 is incorporated.

Next, specific embodiments of the present invention will now be explained.

FIG. 3 is a cross-sectional view illustrating a solid-state image pickup device according to one embodiment of the present invention, which is incorporated in a mobile telephone. Referring to FIG. 3, a printed circuit board 33 having circuit layers 32a and 32b formed on the upper and lower surfaces thereof is disposed in the outer frame 31 of a mobile telephone. A recess 34 having an open top is formed in this printed circuit board 33 in such a manner that a part of the circuit layer 32a is hung over the recess 34. In this recess 34, a solid-state image pickup element 35 is housed and a glass plate 36 acting also as an infrared-cut filter is also disposed over the light-receiving face of the solid-state image pickup element 35 with a predetermined space being interposed therebetween. A plurality of microlenses 37 are formed on the light-receiving face of the solid-state image pickup element 35.

Incidentally, instead of the recess 34, a through-hole may be formed in the printed circuit board 33. As long as the recess or hole is capable of accommodating the solid-state image pickup element 35, the configuration of the recess or hole can be optionally selected.

The electric connection between the solid-state image pickup element 35 and printed circuit board 33 is realized by making use of a sidewall-surrounding circuit layer 38 which is formed on the sidewall of glass plate 36. Namely, an upper portion of the sidewall-surrounding circuit layer 38 is electrically connected with the circuit layer 32a of printed circuit board 33 and an lower portion of the sidewall-surrounding circuit layer 38 is electrically connected, through a bump 39, with electrode pads 40 which are provided at a peripheral portion of the light-receiving face of the solid-state image pickup element 35 as shown in FIG. 4. Incidentally, the electrical connection between the upper portion of the sidewall-surrounding circuit layer 38 and circuit layer 32a of printed circuit board 33 is effected by means of thermocompression bonding between the metallic plated surfaces.

Over the recess 34 of printed circuit board 33, there is disposed a lens-barrel 42 equipped with lenses 41 in a manner to close the recess 34 as well as the opening formed in the outer frame 31. A lower portion of the lens-barrel 42 is secured to the printed circuit board 33 and an upper portion of the lens-barrel 42 is secured to the edge portion of the opening of outer frame 31.

In the case of the solid-state image pickup device which is constructed as described above, since the solid-state image pickup element 35 is housed in the recess 34 provided in the printed circuit board 33, it is possible to reduce the thickness of the solid-state image pickup device, at maximum, by the thickness corresponding to the printed circuit board 33. Therefore, the solid-state image pickup device is suited for use in electronic equipment such as a mobile telephone where the reduction of thickness is desired.

Further, since the electric connection between the solid-state image pickup element 35 and the printed circuit board 33 is realized by making use of a sidewall-surrounding circuit layer 38 which is formed on the sidewall of glass plate 36, it is no longer required to form a sidewall-surrounding circuit layer on the sidewall of the solid-state image pickup element and to form a wiring so as to extend from the upper surface to the underside of the solid-state image pickup element as seen in the conventional solid-state image pickup device, thereby making it possible to simplify the structure of the solid-state image pickup device and to reduce the manufacturing cost of the solid-state image pickup device.

Furthermore, since the glass plate which is constituted by chip-on-glass is enabled, by itself, to act as an infrared-cut filter, it is no longer required to install any additional infrared-cut filter, thereby making it possible to reduce the thickness of the solid-state image pickup device and to simplify the structure of the solid-state image pickup device.

Figure 5:
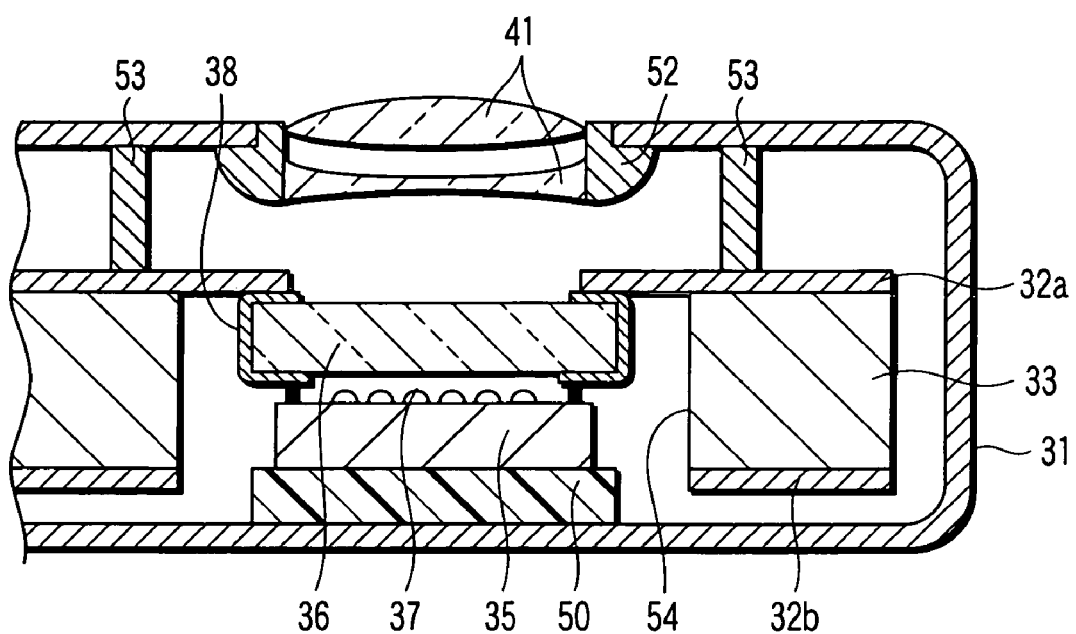
FIG. 5 is a cross-sectional view illustrating a part of a mobile telephone in which the solid-state image pickup device according to another embodiment of the present invention is incorporated.

FIG. 5 is a cross-sectional view illustrating the solid-state image pickup device according to another embodiment of the present invention, which is mounted on a mobile telephone. The structure of the solid-state image pickup device shown in FIG. 5 is the same as that of the solid-state image pickup device shown in FIG. 1 except that a through-hole 54 is formed in place of the recess 34 in the printed circuit board 33 and hence the solid-state image pickup element 35 is placed in this through-hole 54, and that a lens-barrel 52 equipped with lenses 41 is secured only to the edge portion of the opening of outer frame 31 and hence is not secured to the printed circuit board 33. However, for the purposes of reinforcing the strength of device and of shielding the peripheral light, the provision of a cylindrical column 53 having a black inner surface may be useful in actual viewpoint.

Incidentally, the solid-state image pickup element 35 disposed inside the through-hole 54 is secured to the inner bottom of the outer frame 31 of mobile telephone by making use of an adhesive layer 50.

Even in the case of the solid-state image pickup device shown in FIG. 5, since the solid-state image pickup element 35 is housed in the through-hole 54 formed in the printed circuit board 33, it is possible to reduce the thickness of the solid-state image pickup device, at maximum, by the thickness corresponding to the printed circuit board 33. Therefore, the solid-state image pickup device is suited for use in electronic equipment such as a mobile telephone where the reduction of thickness is desired.

What is claimed is:

1. A solid-state image pickup device which comprises:
    a circuit board provided with a hole having an open top and with a circuit layer formed on the upper surface thereof;
    a solid-state image pickup element housed in the hole and having an upper surface constituting a light-receiving face and electrodes formed on a peripheral portion of the upper surface; and
    a glass plate disposed over the light-receiving face of the solid-state image pickup element and provided with a connecting conductive layer which is extended from the underside of the glass plate, via the sidewall of the glass plate, to the upper surface of the glass plate;
    wherein the electrode formed on the peripheral portion of the light-receiving face of the solid-state image pickup element is electrically connected with the connecting conductive layer formed on the underside of glass plate; and the connecting conductive layer formed on the upper surface of glass plate is electrically connected with the circuit layer formed on the upper surface of the circuit board.

2. The solid-state image pickup device according to claim 1, wherein the hole is a recess.

3. The solid-state image pickup device according to claim 1, wherein the hole is a through-hole.

4. The solid-state image pickup device according to claim 1, wherein the glass plate is enabled to act as an infrared-cut filter.

5. The solid-state image pickup device according to claim 1, wherein the electrode formed on the peripheral portion of the light-receiving face of the solid-state image pickup element is electrically connected, through a bump, with the connecting conductive layer formed on the underside of glass plate.

6. The solid-state image pickup device according to claim 1, wherein the light-receiving face of the solid-state image pickup element is provided with a plurality of microlenses.

7. An electronic equipment comprising:
- an outer frame having an opening;
- the solid-state image pickup device defined by claim 1 and incorporated in the outer frame; and
- a lens member secured to the opening of the outer frame in a manner to face a light-receiving face of the solid-state image pickup device.

8. The electronic equipment according to claim 7, wherein the lens member is mounted on a lens-barrel which is attached to the opening of outer frame.

9. The electronic equipment according to claim 7, wherein the lens member is mounted on a lens-barrel which is secured not only to the opening of outer frame but also to the circuit board of the solid-state image pickup device.

10. The electronic equipment according to claim 7, wherein the electronic equipment is a mobile telephone.

* * * * *